Jan. 3, 1956 T. A. LAW 2,729,498
DELIVERY BODIES
Filed March 9, 1953 2 Sheets-Sheet 1

Inventor
Thomas A. Law
By
Richmond A. Hayes
Attorney

Jan. 3, 1956  T. A. LAW  2,729,498
DELIVERY BODIES
Filed March 9, 1953  2 Sheets-Sheet 2

Inventor
Thomas A. Law
By
Richmond H. Hayes
Attorney

United States Patent Office 2,729,498
Patented Jan. 3, 1956

2,729,498

DELIVERY BODIES

Thomas A. Law, Jamestown, N. Y.

Application March 9, 1953, Serial No. 341,019

7 Claims. (Cl. 296—24)

This invention relates to improvements in enclosed delivery bodies for motor vehicles and more particularly to the type intended to accommodate small piece merchandise and facilitate loading and unloading thereof.

In its present form the invention is directed to the interior structure of a delivery body that is intended to receive and transport both packaged and loose and unpackaged merchandise, such, for example, as baked goods. The body is so designed and arranged that ready access to, and withdrawal of any of the goods therein may be conveniently undertaken. The goods are carried on a series of trays which are of such proportions and arrangement that little or no displacement can take place during transit.

Prior to this invention, small piece merchandise, such as baked goods, had been transported in bodies that have merely provided protection against dirt; that is, such bodies were sufficiently well enclosed to comply with sanitary regulations. In the past, delivery bodies for this purpose have been designed with little or no thought as to possible damage to the goods, or ease and convenience of handling. Of course, delivery bodies of the class to which the invention relates are loaded at the place of manufacture of such goods and, once loaded, frequent access must be had to the contents as store to store, or other type of delivery occurs. Heretofore it was necessary to more or less plan the arrangement and quantities of different baked goods in order that they might be accessible at the right place of delivery and in the right quantity. However, considerable objection to this arrangement occurs as the manufacturers of the goods, or the operators who load the vehicle body, are frequently not conversant with the immediate amounts or kinds of goods one or another store or other receiver requires.

The present invention is primarily directed to and has for an object the provision of an enclosed vehicle body for the transportation and delivery of somewhat fragile piece merchandise, such, for example, as baked goods.

Another object of the invention lies in the provision of an enclosed vehicle body in which the goods to be transported may be so arranged that it is possible to display them in the manner in which they are transported.

Another object of the invention lies in the provision of merchandise carrying trays that may be secured against displacement in a vehicle body for transit and may be easily removed at a place of delivery.

A further object of the invention lies in the provision of supporting guides for the vertically spaced stacking of trays, together with means for locking the trays in place or releasing such trays for slidable withdrawal from an open end of the vehicle.

A still further object of the invention lies in the provision of trays, each of which is less than the length of the vehicle body, such trays being interlockable for the purpose of enabling the withdrawal of any group of trays in any stack, regardless of how closely the stacks are arranged.

Other and further objects of the invention will be more fully understood from a consideration of the following specification, taken in conjunction with the accompanying drawing; and in which—

Figure 1:
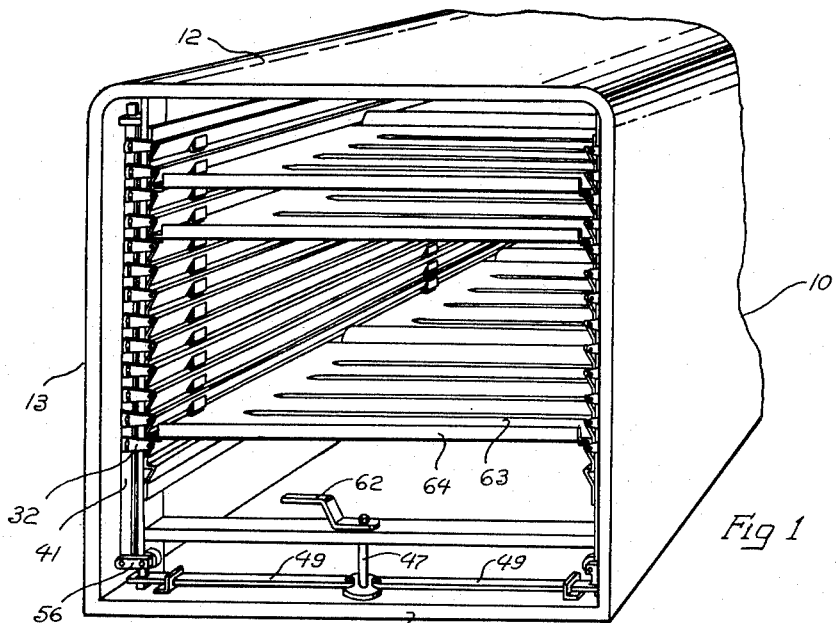
Fig. 1 is a fragmentary perspective rear end view of a vehicle body in which one form of the invention is embodied.

Referring more particularly to the drawing, the reference numeral 10 is employed to generally designate a portion of an enclosed truck body in which one form of the invention is illustrated. The body 10 may be of any conventional construction and includes a base 11, top 12, and side walls 13. The forward end, although not shown, is preferably closed. The rear or access end of the body is shown to be open and without doors to close such opening. However, the doors constitute no part of the invention and have therefore been dispensed with in order that the actual structure of the invention may be more clearly disclosed.

Figure 2:
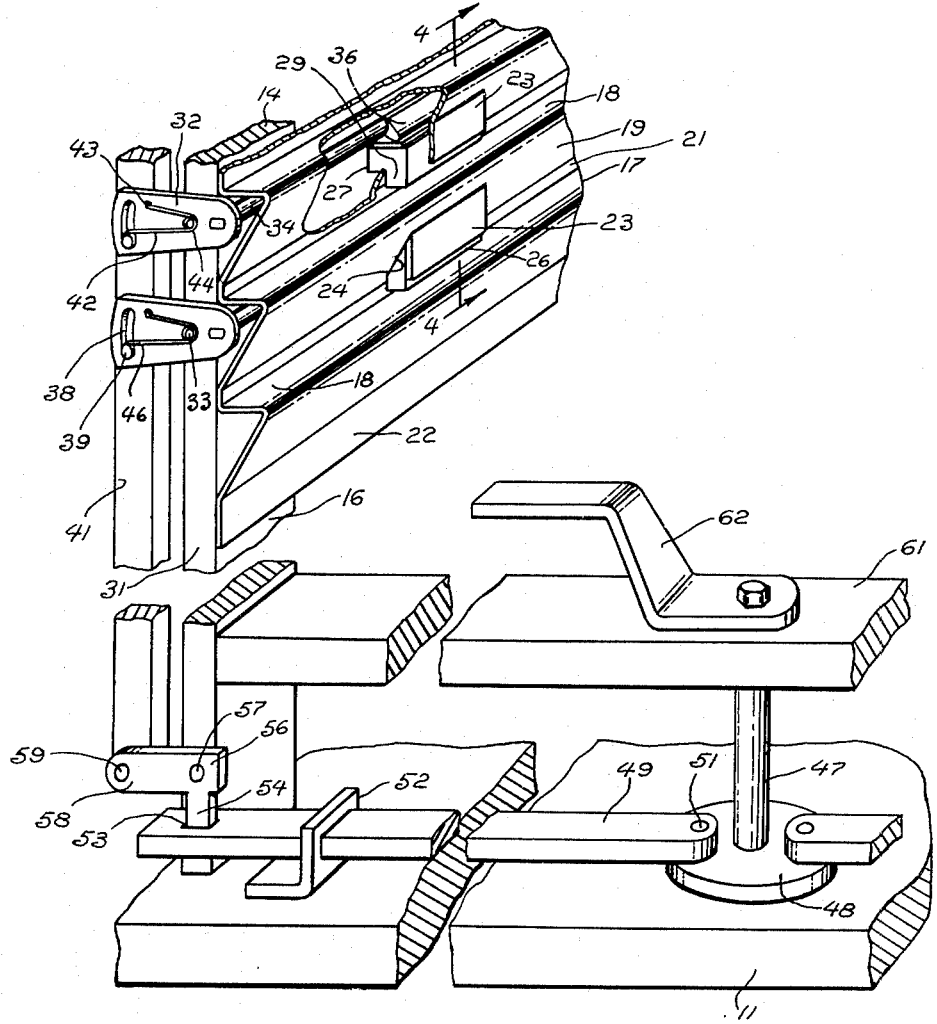
Fig. 2 is an enlarged fragmentary perspective view of a portion of the structure of Fig. 1 and shows multiple tray supports, together with means for locking trays in such supports.

Referring particularly to Figs. 1 and 2, it is to be noted that the bottom and top walls 11 and 12 provide end supports for bars 14. At least two of these bars are located in close proximity to each side wall 13, the spacing thereof being only sufficient to enable positioning other operative parts of the invention. Attached to the inner face 16 of the two or more bars, adjacent a given side wall, is an inner body wall or lining, generally indicated at 17. This lining resembles a corrugated sheet and will be seen to include a multiplicity of shallow horizontal ledges 18. Each ledge is integral with the ledge therebeneath, through an inclined portion 19 and vertical flange 21. Each of the flanges 21 abuts the faces 16 of bars 14. Permanent securement thereto may be had in any suitable manner, as by welding. Beneath the lowermost ledge 18, the vertical portion of this lining is of the nature of a fairly long flange 22. It will be observed that the inclined portion 19, between ledges 18, is formed with a series of vertical, downwardly extending, struck out flanges 23. The flange in each portion 19 is in vertical alignment with the flange thereabove and at least two such flanges are produced in each of the portions 19. An opening 24 is, of course, formed in the portion 19 by bending out the flange 23. Mounted in this opening is a resilient block 26 that, in cross section, is L shaped, one leg 27 extending into the space 28 formed by the portion 19 and ledge 18, and the other leg 29 projecting downwardly along the inner face of flange 23 and therebeyond, substantially as illustrated. The lower edge of the leg 29 is in reasonably close proximity with the ledge 18 located therebeneath.

The edges 31 of bars 14 serve to mount a series of rocker arms 32 by means of pins 33. It is pointed out that, although the bars 14, at the forward end of the vehicle, are not shown, these two bars, on their forward edges, mount cooperative rocker arms which function in the manner hereafter described. Each arm 32 extends inwardly beyond the face 16 of the bar and any one such arm and the correspondingly located arm at the other end of the body support a rod 34. The ends of this rod are of rectangular form to enter rectangular openings in the arms. Thus, it will be understood that rotation of one of the arms about its pivot causes rod 34 to move in the path of such rotation. Each rod 34 has integral lugs 36. These lugs are at a location and of a number corresponding to the opening 24 formed by the struck out flanges 23. The free edge of each lug rests upon a metal strip 37 that is placed on and secured to the upper face of each block 26.

That portion of each rocker arm 32 extending away from the inner face of the bar 14, is formed with a slot 38 through which a pin 39 projects that is carried by a vertically reciprocable bar 41. A hairpin spring 42 has one end 43 secured to the arm as by projecting the bent end thereof into an opening in said arm. The base 44 of this spring encircles the arm mounting pin 33. The other end 46 of this spring engages pin 39. Since this spring is of the expanding leg type, it will be evident that its purpose is to normally cause the pin 39 to occupy the lower end of the slot 38 of the arm 32, substantially as illustrated in several figures of the drawing.

At the rear of the bottom wall 11 of the vehicle body there is mounted an upstanding shaft 47. The lower end of this shaft is supported in any suitable way by the base 11, and adjacent thereto carries a disk 48. One end of a link 49 is pivotally joined to the disk by a pin 51. This link extends laterally toward one side wall 13 of the body, being supported and guided for movement in an angle bracket 52 which is secured to the base 11. Beyond the bracket 52, the link 49 is formed with a vertical slot 53 into which an arm 54 of a bellcrank 56 projects. The bellcrank is mounted for pivotal movement on the edge 31 of bar 14 by a pin 57. The other arm 58 of the crank is joined to the lower end of the reciprocable bar 41 through a pin 59. The shaft 47 projects upwardly through a cross member 61 and mounts an operating lever 62. Inasmuch as both side walls 13 of the body are equipped with the structure above described, two links 49, cranks 56 and bars 41, will function when the lever 62 is operated.

Figure 9:
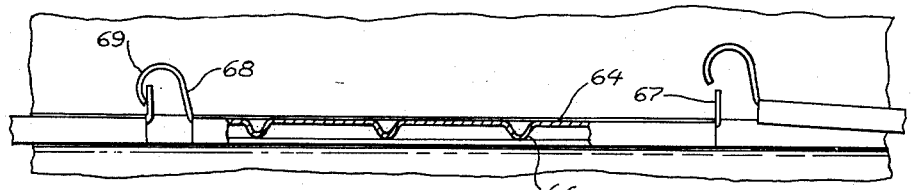
Fig. 9 is a side view of several of the trays, partly in section, showing tray interlocking structure.

As has been mentioned, the lining 17 includes a series of spaced ledges 18 and these ledges are intended to support the ends of merchandise carrying trays 63. Each tray is of a length to span the space between the linings 17, with the ends resting on corresponding ledges 18. For convenience in handling, as well as to provide additional facilities for arrangement and delivery, the trays are of such width that three or possibly four of them may be mounted on a given pair of ledges within the length of the body. Each tray 63 is formed with a supporting base 64 that is reinforced in its lengthwise direction by depending ribs 66. The rearmost side of the tray, as considered in connection with the vehicle body, is formed with an upstanding flange 67. The opposite side of the tray is formed with a nearly vertical flange 68 that terminates in a downwardly curved lip 69. This lip is so designed that, when two trays are mounted in the body, it will overlie the flange 67 of the next adjacent tray, substantially as indicated in Fig. 9 of the drawing. The ends of the tray continue in the plane of the base 64 beyond the flanges 67 and 68 and are return-bent to provide base flanges 71 which may, as shown, lie against the under face of the ends of ribs 66. The tray ends are of an extent and depth to correspond to the width of the ledge 18 and approximately the height of the vertical flange 21.

Figures 3, 4, 5, 6, 7:
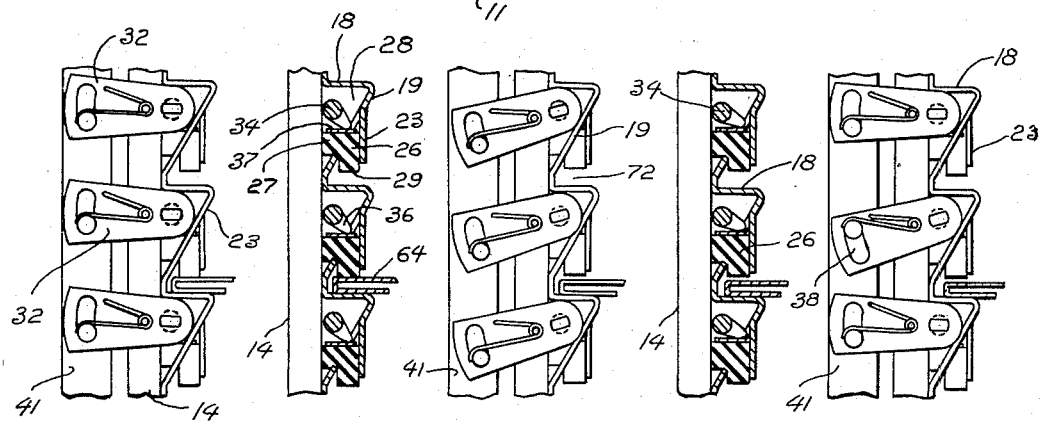
Fig. 3 is a fragmentary rear end view of the tray locking mechanism in operative position.
Fig. 4 is a fragmentary vertical sectional view, taken substantially in the direction and at the place indicated by the line 4—4 of Fig. 2, and shows the clamping members in operative position.
Fig. 5 is a view similar to Fig. 3, showing the locking mechanism in inoperative position.
Fig. 6 is a fragmentary vertical sectional view similar to Fig. 4, and shows the clamping members in released position.
Fig. 7 is a fragmentary rear elevational view of the locking mechanism, showing that such mechanism may be operated to individually release one stack of trays.
Figure 8:
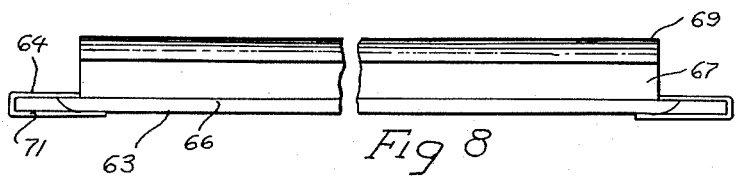
Fig. 8 is an end view of one of the trays embodied in the invention.

In order that a more complete understanding of the invention may be had, a brief description of the use and operation of the invention is herein set out. It may be assumed that two or three trays of baked goods are to be placed on a given pair of ledges 18 in the vehicle body. The doors (not shown) are first opened. Following this, the lever 62 may be rotated ninety degrees in a counter-clockwise direction to extend the lever rearwardly of the body and into a position such that the body doors could not be closed. Rotation of the lever from the position shown in Figs. 1 and 2 to the position mentioned above, causes links 49 to be drawn inwardly from the sides of the body, which, in turn, rotate cranks 56, moving bars 41 downwardly. Such movement of the bars 41 rotates arms 32 from the position shown in Fig. 3 to that shown in Fig. 5. Thus, the rods 34 have been raised to allow slight upward movement of the resilient blocks 26 and the space thus provided (Fig. 5), as indicated by the numeral 72, is of sufficient height to enable entry of the ends 64 of the tray 63. Such a tray may be moved inwardly along the ledges as far as can conveniently be reached. A second tray is placed on the same ledges 18 and moved therealong until the lip 69 contacts flange 67. If the vehicle body is of a length substantially equal to three trays 63, then a third such tray may be mounted on the ledges and moved inwardly, pushing the two previously mounted trays farther forward in the body. Final movement of the last tray to enter the body causes the lip 69 of the second and third trays to slide up over the flanges 67 and engage the lips 69 therewith. Thus, these three trays are so linked that when the last mounted tray is withdrawn, the remaining trays will be drawn rearwardly of the body toward the open rear end and will be easily accessible in the same manner as the rearmost tray. When the rearmost tray is practically withdrawn from off the ledges 18, it can be tilted downwardly to a very slight extent and thus lip 69 thereof will be disengaged from the flange 67 of the next tray.

Assuming that three trays have been mounted in the body, it is now desired to lock them against displacement. This is accomplished by rotating the lever 62 in a clockwise direction until it assumes the position shown in Figs. 1 and 2. Such movement causes bars 41 to be raised, swinging arms 32 about their pivots and bringing lugs 36 into pressure contact with the strips 37 of blocks 36. Sufficient pressure on the blocks is applied to squeeze and force them into a downwardly extending position wherein they yieldingly engage the extended ends 64 of any trays that may be mounted in the body. A comparison of Fig. 6 with Fig. 4 clearly indicates that the change in shape of the resilient blocks 26 is sufficient to bring them into pressure engagement with the tray ends. In this manner, any trays that are mounted on any sets of ledges in the body are secured against vibration, vertical, lateral, or endwise displacement. On occasion a delivery vehicle may be stopped on an incline and it is evident that, following release of the trays by the lever 62, such trays might have a tendency to all slide out of the body. Yet, for such a delivery it might be necessary to only remove some one or two trays. Under such circumstances, the operator of the vehicle does not actuate the lever 62 but merely reaches with both hands to depress the extended ends of corresponding arms 32 to the position suggested by one of such arms in Fig. 7. While these arms are depressed in this position, the corresponding tray may be withdrawn. However, all of the other trays will still be secured against displacement or removal. It is considered to be a simple expedient, in holding the desired pair of arms in a turned position and against tension of springs 42, to merely insert suitable plugs into the slots 38, following which the released tray or trays may be readily removed or replaced.

Although applicant has shown and described only one modification of his invention, it will be apparent that variations in the structure may be made in adapting it to the carrying of different kinds and sizes of merchandise and that such variations are contemplated as being within the spirit and scope of the invention insofar as they are set out in the annexed claims.

Having thus set forth my invention, what I claim as new and for which I desire protection by Letters Patent is:

1. In an enclosed delivery body, structure for supporting trays in verticaly spaced arrangement comprising a pair of spaced vertical panels, vertically spaced ledges formed in and extending substantially the length of said panels, resilient members interposed between said ledges, further means operable to depress the members located between any pair of ledges into proximity with the ledge next beneath, linkage connecting said further means, and a lever operable to actuate said linkage.

2. Structure for mounting a series of merchandise trays in stacked arrangement comprising a pair of spaced vertical walls, vertically spaced ledges formed in and extending substantially the full length of said walls, corresponding ledges of said walls providing end support for a tray, portions of said walls connecting said ledges, said portions being formed with vertically arranged openings, clamping members in said openings, means connected with all of said members, and a lever associated with said means and operable to effect simultaneous movement of said members into pressure engagement with the ends of any trays mounted on said ledges.

3. Tray supporting structure comprising a pair of spaced vertical panels, vertically spaced ledges formed in and extending the full length of said panels, portions of said panels connecting said ledges, said portions being formed with vertically arranged openings, resilient clamping members projecting through openings to a given extent toward said ledges, means movable into pressure contact with said members whereby to extend them into close proximity with said ledges, and manually operable means associated with said movable means.

4. Tray supporting and securing structure comprising duplicate, spaced, vertical panels, horizontal ledges formed in and extending substantially the full length of each panel, those portions of each panel between said ledges having openings directly over the ledge next beneath, resilient members projecting through said openings to a limited extent to permit movement of a tray end onto the ledge therebeneath, lugs engaged with said members, and means operable to simultaneously move said lugs to an extent to depress said members into pressure engagement with a tray end.

5. In a tray supporting and securing structure, a vertical panel, horizontal ledges formed in and extending substantially the full length of said panel, inclined portions of said panel connecting adjacent ledges, each of said portions being provided with a series of openings located directly over the ledge next beneath, resilient members carried by said panel and having portions projecting downwardly through said openings, and means engageable with and operable to depress said members into contact with a tray end adapted to be mounted on any of said ledges.

6. In a tray supporting and securing structure, a vertical panel, horizontal ledges formed in and extending substantially the full length of said panel, inclined portions of said panel connecting adjacent ledges, each of said portions being provided with a series of openings located directly over the ledge next beneath, resilient members carried by said panel and having portions projecting downwardly through said openings, a cam rod associated with the members for each ledge, an operating lever, linkage yieldably connecting said lever with the rods for all of said members, said linkage enabling movement of any of said rods independently of operation of said lever.

7. Structure for mounting a series of trays in stacked arrangement comprising a pair of spaced vertical walls, vertically spaced ledges extending horizontally inwardly from said walls, corresponding ledges providing end support for a tray, wall portions connecting said ledges, said portions having vertically arranged openings, resilient clamping members projecting through said openings, means engaged with all of the members between a pair of given ledges, and a lever associated with said means and operable to effect simultaneous movement of said members into pressure engagement with the ends of any trays mounted on said ledges.

References Cited in the file of this patent

UNITED STATES PATENTS

| | | |
|---|---|---|
| 518,848 | Milbank | Apr. 24, 1894 |
| 2,076,099 | Smith et al. | Apr. 6, 1937 |
| 2,517,284 | Calvert | Aug. 1, 1950 |
| 2,587,396 | Smayda, Jr. | Feb. 26, 1952 |